United States Patent [19]

Miyoshi et al.

[11] Patent Number: 5,247,500
[45] Date of Patent: Sep. 21, 1993

[54] ELEVATING AND LOWERING SYSTEM IN A MULTI-DISK PLAYER

[75] Inventors: Seizo Miyoshi, Neyagawa; Yukio Morioka, Katano, both of Japan

[73] Assignee: Matsushita Electric Industrial Co., Ltd., Osaka, Japan

[21] Appl. No.: 855,443

[22] PCT Filed: Dec. 7, 1988

[86] PCT No.: PCT/JP88/01231

§ 371 Date: Oct. 5, 1989

§ 102(e) Date: Oct. 5, 1989

[87] PCT Pub. No.: WO89/05508

PCT Pub. Date: Jun. 15, 1989

Related U.S. Application Data

[63] Continuation of Ser. No. 393,906, Oct. 5, 1989, abandoned.

[30] Foreign Application Priority Data

Dec. 9, 1987 [JP] Japan .................. 62-311502

[51] Int. Cl.[5] .................. G11B 17/04; B25B 7/02
[52] U.S. Cl. .................. 369/38; 369/36; 369/192; 74/424.6
[58] Field of Search .................. 369/34, 36, 38, 39, 369/75.2, 77.1, 77.2, 178, 192, 194; 74/120, 122, 422, 424.6

[56] References Cited

U.S. PATENT DOCUMENTS

| 106,248 | 8/1870 | Bechtel | 74/424.6 |
| 129,339 | 7/1872 | Hawkes | 74/424.6 |
| 2,883,875 | 4/1959 | Davidson | 74/424.6 |
| 4,479,210 | 10/1984 | Nakayama | 369/194 |
| 4,498,162 | 2/1985 | Schatteman | 369/194 X |
| 4,616,357 | 10/1986 | Nakayama | 369/36 |
| 4,691,309 | 9/1987 | Suzuki | 369/194 |
| 4,722,078 | 1/1988 | Nakanishi et al. | 369/39 |
| 4,737,945 | 4/1988 | Yamazaki et al. | 369/36 |
| 4,809,252 | 2/1989 | Ikedo et al. | 369/36 X |

FOREIGN PATENT DOCUMENTS

| 0230665 | 10/1986 | Japan | 369/36 |
| 0034357 | 2/1987 | Japan | 369/192 |

Primary Examiner—John Shepperd
Assistant Examiner—Edward H. Sikorski
Attorney, Agent, or Firm—Panitch Schwarze Jacobs & Nadel

[57] ABSTRACT

The invention relates to a multi-disk player which can store a plurality of disks and can choose any of the stored disks for consecutive play. An elevating and lowering rack (44) provided at one end of a loading base (12) is driven by a worm gear (43) to incrementally raise and lower the loading base for selectively supplying a disk from a magazine to the disk playing section. The loading base also has a horizontal retaining structure, including an elevating and lowering level (49) and a sub elevating and lowering lever (50), installed at both sides of the loading base.

1 Claim, 7 Drawing Sheets

ELEVATING AND LOWERING SYSTEM IN A MULTI-DISK PLAYER

This is a continuation of Ser. No. 393,906, filed Oct. 5, 1989, now abandoned.

TECHNICAL FIELD

The present invention relates to a disk player. More particularly, it relates to a multi-disk player in which a plurality of disks can be stored and by which any of disks stored therein can be chosen by turns and can be played consecutively.

BACKGROUND ART

Recently various kinds of digital audio disks have been sold, and the utilization thereof has been remarkably expanding. Various kinds of multi-disk players by which six to ten disks can be consecutively played have been developed. Many of these multi-disk players are of such a type that consecutive playing can be made available by vertically shifting the whole light pick-up block which can read signals by using laser light. Since a heavy light pick up block is vertically driven, a mechanism to drive the light pick up block is complicated in structure and expensive.

The conventional multi-disk player mentioned above is explained below:

FIG. 8 shows a conventional type of multi-disk player. In FIG. 8, a disk 102 placed on a disk holder 101a of a tray 101 is arranged and stored by turns in the six-storied shelves 103a which are formed in a magazine 103, and the disk 102 can be freely drawn out from and stored in these shelves.

The reference numeral 104 is the mechanism body of the multi-disk player, and the above magazine 103 is always housed at a fixed position in a box-like magazine base 105 to house the magazine.

The reference numeral 106 is a magazine push-out lever which is pushed in the direction of A by insertion of the magazine 103 at all times, and the magazine push-out lever is so composed that it can be pushed out in the direction of B by means of a spring 107.

The reference numeral 108 is a magazine lock lever to lock the magazine, and the magazine lock lever is so composed that it can be engaged by means of a drawing spring 109 with a dent 103b formed at a side wall of the magazine 103 and the magazine 103 can be prevented from being pushed out in the direction of B thereof.

The reference numeral 110 is a plunger which is so composed that the plunger 110 can disengage the magazine lock lever 108 from the dent 103b formed at a side wall of the magazine 103 by electric current flown to the plunger when taking out the magazine 103 and that the magazine 103 can be pushed out by the magazine push-out lever 106.

The reference numeral 111 is a speed control device to control the push-out speed of the magazine, which is so composed that it is pressure-fitted to the magazine push-out lever 106 and can control the push-out speed of the magazine 103.

The reference numeral 112 is a tray hook which is so composed that it can slide in either direction of A or B, being guided by a guide shaft 114 provided at a loading base 113 for feeding the tray 101 to the playing start position. The reference numeral 115 is a tray hook drive motor installed on the loading base, which can drive the tray hook 112 in either direction A and B by means of a pulley 116 and a belt 117, thereby causing the dent 101b of the tray 101 to be engaged with the above tray hook 112 and the tray 101 to be drawn out from the magazine 103 and to be housed in the same.

The reference numeral 118 is a tray guide which is located on the loading base 113 and is provided to start playing the disk 102 after the tray 101 is guided onto a turntable 120 of the light pick-up block 119.

The reference numeral 121 are threaded screws which are so composed that they can be fitted to female-threaded portions 122 installed at three points at the periphery of the loading base 113 to vertically elevate and lower the loading base 113 and that the loading base 113 can be vertically elevated and lowered.

The reference numeral 123 is a timing belt which drives the three threaded screws in engagement of small gears 124 provided at the lower part of each of the three threaded screws 121 and which can be driven by an elevating and lowering drive motor 125.

The operation of a multi-disk player so composed as mentioned above is explained below:

As the magazine 103 in which six disks 102 and the tray 101 are housed is inserted in the magazine base 105, the magazine 103 is locked at a fixed position by means of a push-back force of the magazine push-out lever 106 and the magazine lock lever 108. Next, the loading base 113 is elevated and lowered to revolution of the drive motor 125 and stops at a height where the tray hook 112 can be engaged with the dent 101b of the tray 101.

Subsequently, as the tray hook drive motor 115 rotates clockwise, the tray hook 112 draws out the tray 101 in the direction of A. Then, the motor 115 stops when the center of the disk 102 comes onto the center of the turntable 120, and the disk is started for playing.

The tray hook drive motor 115 rotates counterclockwise as the playing ends, the tray hook 112 pushes back the tray 101 in the direction of B and the tray 101 is housed in the magazine 103.

As current is supplied to the plunger 110, the magazine lock lever 108 is disengaged from the dent 103b of the magazine 103, thereby causing the magazine 103 to be pushed out in the direction of B by means of the magazine push-out lever 106 and causing the magazine to be taken out from the multi-disk player 104.

However, in the construction mentioned above, since the loading base 113 having a heavy light pick-up block 119, the tray hook drive motor, etc. are elevated and lowered by three threaded screws 121, a heavy-duty elevating and lowering structure is required. In addition, the whole structure becomes complicated and the production cost thereof becomes expensive.

Moreover, there is still another problem that since the weight of the whole loading base 113 is heavy it is impossible to quicken the elevating and lowering speed.

DISCLOSURE OF THE INVENTION

This invention was made, considering the above problems. It is an object of the invention to provide a multi-disk player whose loading base is lightened to cause the elevating and lowering speed to be quickened and the elevating and lowering structure to be simplified, by attaching a heavy light pick-up block, a tray hook, a tray hook drive motor, etc. to the body side.

To solve the above problems, (1) the multi-disk player of this invention comprises a magazine in which a plurality of disks are arranged and housed by turns, a loading base which can be elevated and lowered in the vertical direction opposite to the magazine and can choose any of the stored disks by turns, an elevating and lowering drive portion of the loading base to transmit an elevating and lowering drive force to part of the above loading base, an elevating and lowering lever, one end of which is pivoted at the above loading base and the other end of which is slidably pivoted at the mechanism body of the multi-disk player, a sub elevating and lowering lever, one end of which is pivoted at the above mechanism body and the other end of which is slidably pivoted at the loading base, a pin being provided at the rough center of either of the elevating and lowering lever or the sub elevating and lowering lever, a slot being provided at the rough center of the other one thereof, the elevating and lowering lever being engaged with the sub lever by means of the pin and the slot and being intercrossed and arranged roughly like an X shape, the loading base being horizontally retained by both the levers, and at the same time the loading base being elevated and lowered by the above elevating and lowering drive portion.

(2) Moreover, the elevating and lowering drive portion comprises an elevating and lowering rack provided at part of the loading base, an elevating and lowering worm gear provided at the above mechanism body for driving the above elevating and lowering rack, and a drive source of the elevating and lowering worm gear, the above elevating and lowering rack being driven in the vertical direction by rotating the above elevating and lowering worm gear by means of a drive force from the above drive source.

According to the above structure, one elevating and lowering rack provided at one end of the loading base is vertically driven by means of one elevating and lowering worm gear provided at the body side of the mechanism, thereby causing the horizontal retaining structure of the loading base, which consists of an elevating and lowering lever and a sub elevating and lowering lever provided at the side of the loading base, to be driven. Thus, the whole loading base is so composed and driven that the horizontality thereof can be maintained.

As a result, vertical drive of the loading base can be secured only by means of one elevating and lowering rack and one elevating and lowering worm gear. Therefore, load for elevating and lowering thereof is lightened, and high-speeded vertical drive is also made possible.

PREFERRED EMBODIMENT OF THE INVENTION

With reference to the drawings attached hereto, one of the preferred embodiments of the invention is explained.

Figure 1:
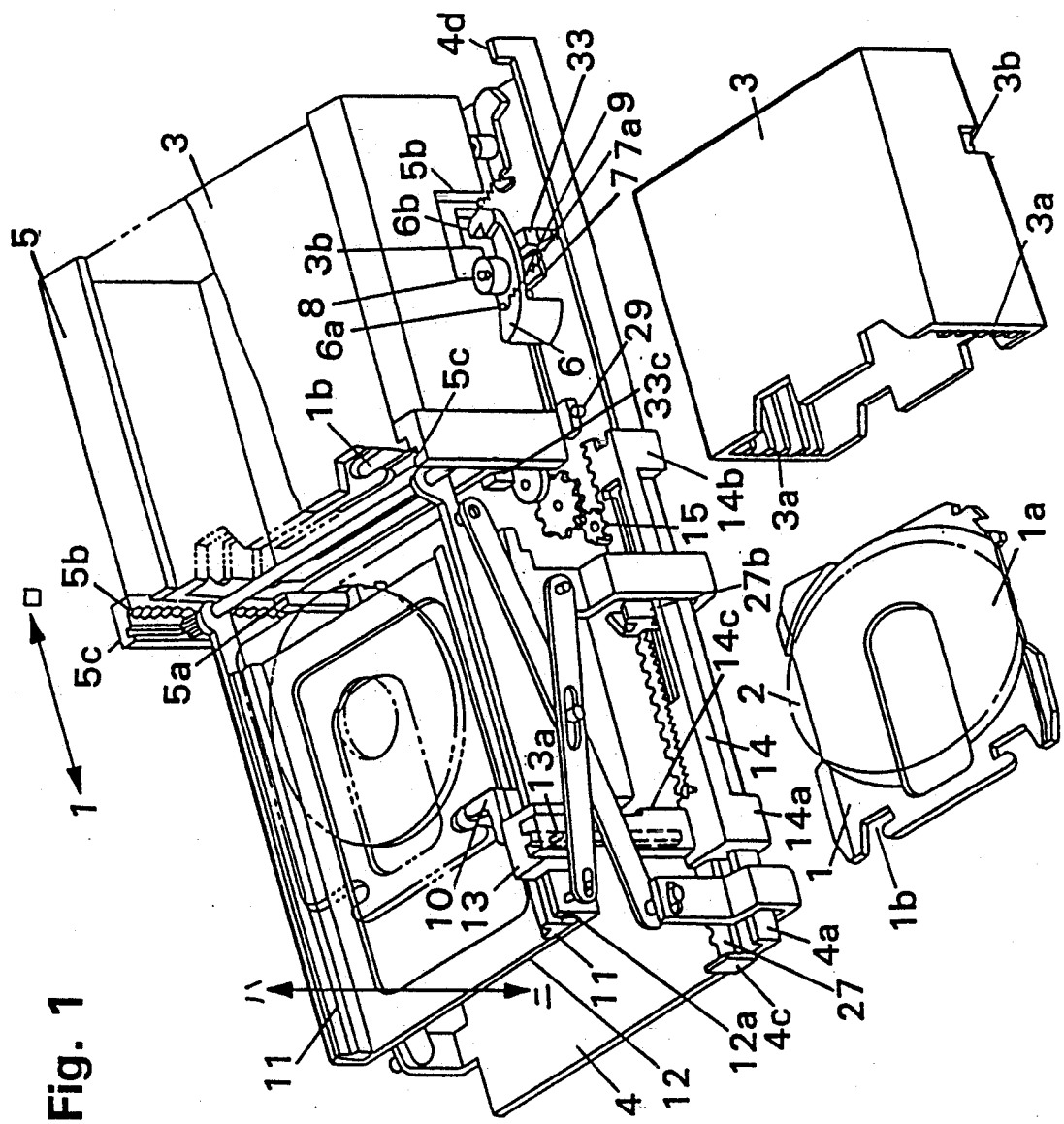
FIG. 1 is a perspective view showing the mechanism of a multi-disk player of this invention.

In FIG. 1, a disk 2 placed on a disk holder 1a of a tray 1 is arranged and stored by turns in the six-storied shelves 3a which are formed in a magazine 3, and the disk can be freely drawn out from and stored in these shelves.

The reference numeral 4 is the mechanism body of a multi-disk player of the invention, and in the magazine base 5 formed to be box-like to house the magazine, the above magazine 3 is inserted up to the position where it is brought into contact at all times with a stopper 5a which is formed at the magazine base 5.

The reference numeral 6 is a magazine lock lever by which the magazine 3 inserted in the magazine base 5 is prevented from jumping out, and the magazine lock lever is so composed that it can rotate, centering around a mounting shaft 8 on the magazine base plate 7 provided at the lower part of the magazine base 5.

The reference numeral 9 is a lock lever drawing spring to rotatably move the magazine lock lever 6, and the spring is energy-charged between a spring hook pin 6a provided at the upper part of the magazine lock lever 6 and a spring hook portion 7a provided at the magazine base plate 7.

The reference numeral 6b is a hook portion formed at the leading edge of the magazine lock lever 6, and the hook portion passes through an opening 5b provided at the magazine base 5 and is engaged with a dent 3b formed at the side wall of the magazine 3, thereby causing the magazine 3 to be prevented from jumping out.

The reference numeral 10 is a tray hook and is engaged with a dent 1b of the tray 1 housed in the magazine 3 in order to draw out the tray 1. And the tray hook is installed at a tray hook block 13 so composed as to slide in either direction of A or B along with a bent portion 12a of a loading base 12 having tray guides 11 to guide the tray 1 at both the ends.

The reference numeral 14 is a drive rack to drive the tray hook block 13 in either direction of A or B in order to draw out the tray 1 from or to house the same in the magazine 3 by driving the tray 1 in either direction of A or B. And the drive rack 14 is so composed that guide portions 14a and 14b provided at the lower part thereof are engaged with a bent portion 4a of the mechanism body 4 and the drive rack can slide in either direction of A or B.

Figure 2:
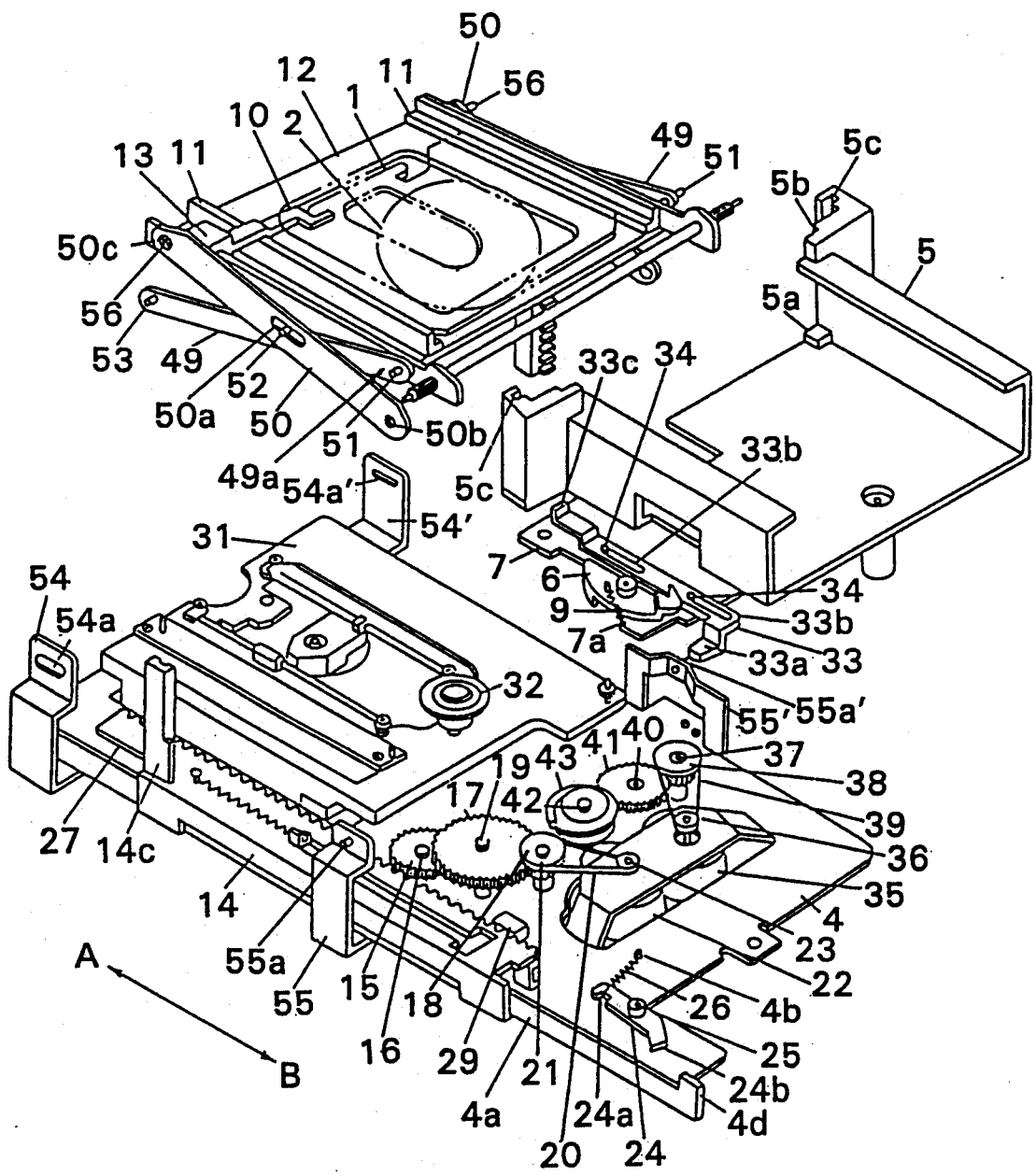
FIG. 2 is an exploded perspective view of the mechanism.

The reference numeral 14c is column means installed at one end of the above drive rack 14, the section thereof being dented and being open upwards, with which a projection 13a of the tray hook block 13 is fitted and can vertically slide. FIG. 2 is an exploded of the multi-disk player of this invention, and a drive gear 15 rotates, centering around an axis 16 installed on the mechanism body 4 and engages the teeth 14g of the drive rack to drive the drive rack in either of A or B.

The reference numeral 17 is an intermediate gear for speed reduction, so composed as to be engaged with the drive gear 15 and a drive pulley 18 and as to rotate centering around an axis 19.

The reference numeral 20 is a belt provided between a drive pulley 18 so installed as to rotate centering around an axis 21 and another pulley 23 provided on the upper part of a motor 22, and the belt transmits rotation of the motor 22 to the drive pulley 18.

The reference numeral 24 is a gear set lever so provided as to rotate centering around an axis 25, and a gear set spring 26 is energy-charged between a dent 24a at one end thereof and a spring hook portion 4b installed at the mechanism body 4.

Figure 3:
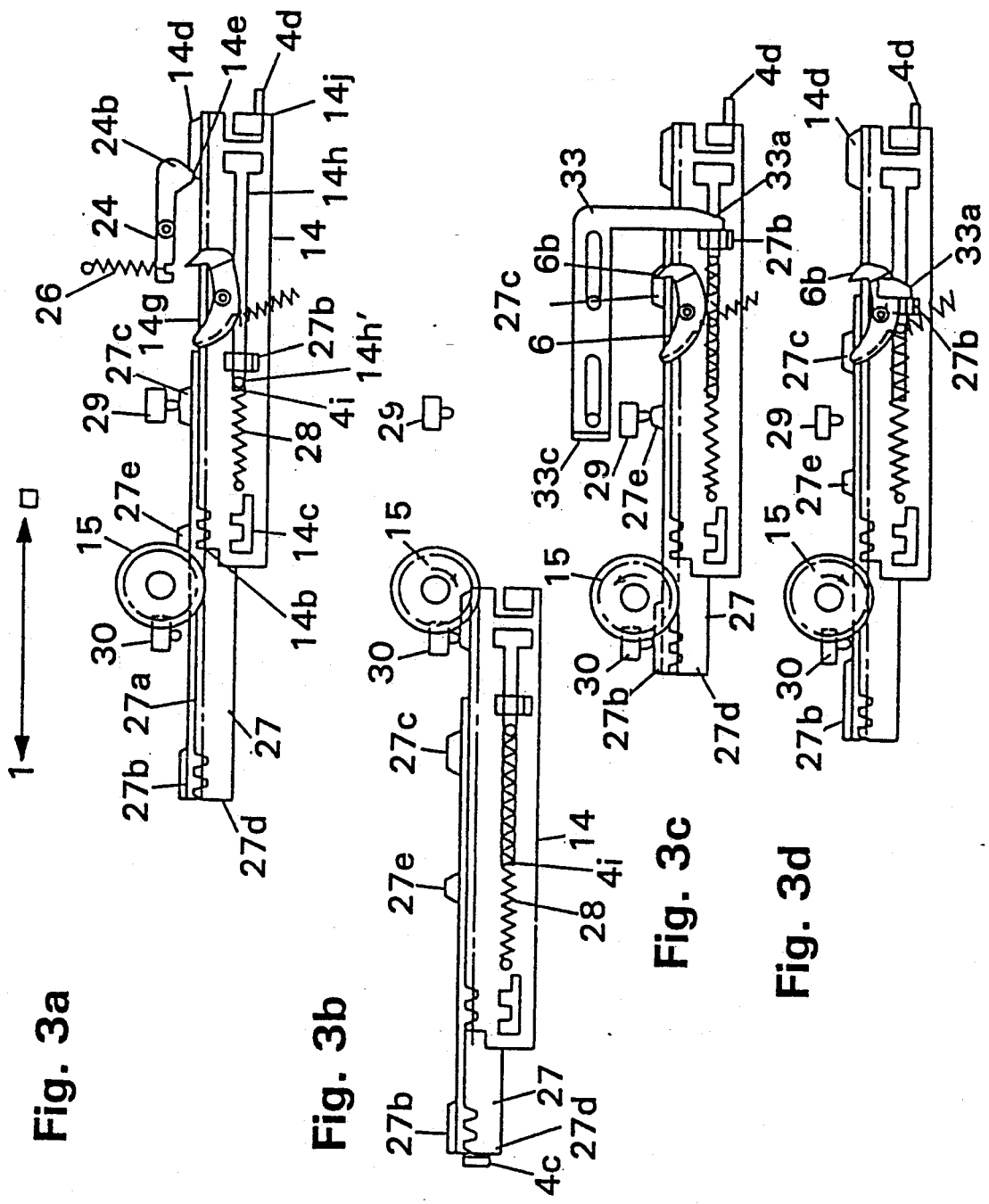
FIG. 3 is a plan view to explain horizontal drive movements of the multi-disk player, FIG. 4 and FIG. 5, respectively, are perspective views to explain a magazine lock and cancellation thereof.

The reference numeral 24b is a projection installed at the other end of the gear set lever 24, and the projection is so composed that when the drive rack 14 is sent in the direction of B by means of the drive gear 15, as shown in FIG. 3A, an inclined plane 14e of the projection 14d of the drive rack 14 is furthermore pushed in the direction of B and the untoothed section 14b of the drive rack 14 can be separated from the drive gear 15.

At this position, the tray hook 10 is set in the dent 1b of the tray 1 housed in the magazine 3 with a fixed clearance therebetween, and the tray hook is so composed that it is shiftable in either direction C or D.

The reference numeral 27 is a differential rack by which the magazine 3 is pushed out in the direction of B and is slidably mounted below the drive rack 14. So, the differential rack is so composed that the centerline of teeth 14g of the drive rack 14 can be in perfect alignment with the centerline of teeth 27a of the differential rack 27 on the same plane as the differential rack can be shiftable in the direction A or B.

The reference numeral 27b is a switch dog which is projected upwards of the surface of slot 14h of the drive rack 14 and is used to push out the magazine 3. In addition, this switch dog is so composed that it can be drawn to the end portion 14h' of the slot of the drive rack 14 by means of the drawing spring 28 at all times. At this time, the teeth 14g of the drive rack 14 and the teeth 27a of the differential rack 27 are so located that the threads and roots thereof can completely match each other.

FIG. 3A shows a state that the tray 1 is housed in the magazine 3 by means of the tray hook 10. A switch 29 installed on the mechanism body 4 and another switch 30 are composed in such a positional relationship that the former switch 29 can be turned ON with being pushed by a switch dog 27c provided on the differential rack 27 and the latter switch 30 can be turned OFF.

When the drive gear 15 rotates in the direction of an arrow in FIG. 3B, firstly the differential rack 27 is driven in the direction of A. Next the differential rack 27 is engaged with the drive gear 15 together with the drive rack 14, and advances in the direction of B. As the drive rack 14 is further driven in the direction of A, terminating the engagement with the differential rack 27, the end portion 27d of the differential rack 27 is brought into contact with the stopper 4c of the mechanism body 4 and stops. Still further, as the drive rack 14 advances in the direction of A, the differential rack 27 slides on the drive rack 14. Then, as the differential rack enters the state shown in FIG. 3B, the tray hook 10 draws out the tray 1 in the direction of B from the magazine 3, and the center of a disk 2 placed on the tray 1 stops at the center of the turntable 32 of the light pick-up block 31, which has been already known, provided at the mechanism body 4 as shown in FIG. 2.

At this time, the switch 29 and the switch 30 are composed in such a positional relationship that the former switch 29 is turned OFF and the latter switch 30 is turned ON with being pushed by a projection 14d of the drive rack 14.

Next, the drive gear 15 rotates counterclockwise as shown by an arrow in FIG. 3C, the drive rack 14 is driven in the direction of B and the projection 27b of the differential rack 27 is drawn by the drawing spring 28. Thus, the projection is brought into contact with the slot 14i of the drive rack 14.

Furthermore, as the drive rack 14 is driven in the direction of B, the differential rack 27 and the drive rack 14 are engaged with the drive gear 15 altogether. As shown in FIG. 3A, the drive gear 15 is disengaged from the drive rack 14. As the drive rack 14 is furthermore pushed out in the direction of B by the gear set lever 24, the end portion 14j of the drive rack 14 is brought into contact with the stopper 4d of the mechanism body 4 and stops.

Figure 4:
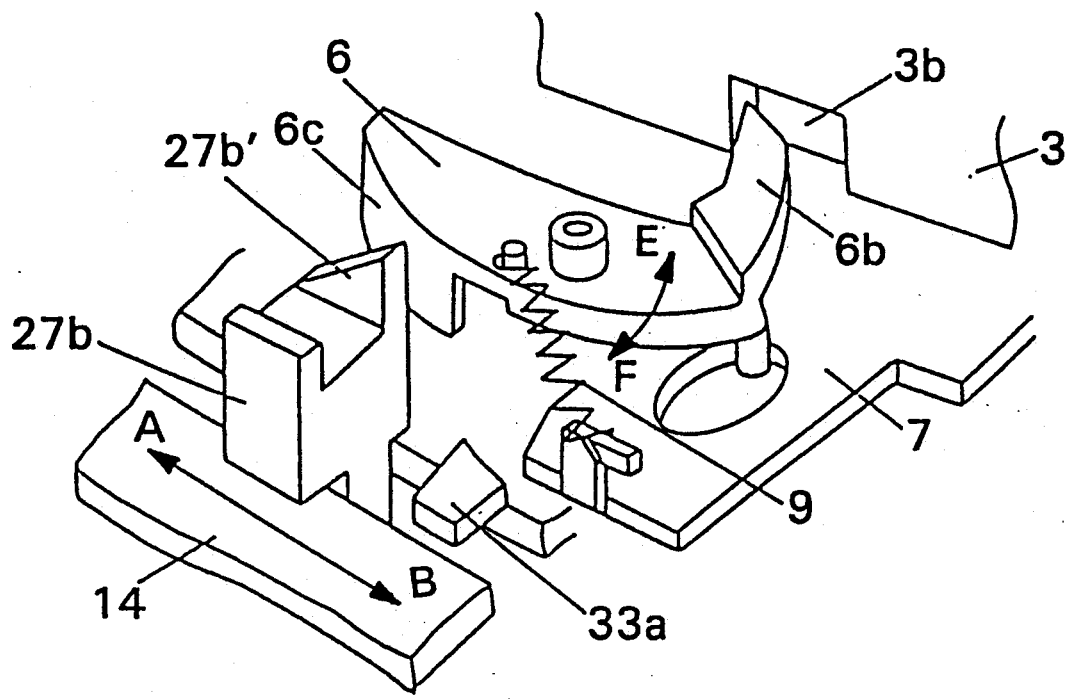

Still further, as the drive gear 15 rotates in the direction of an arrow as shown in FIG. 3C, only the differential rack 27 is driven in the direction of B, and a projection 27b' which has an inclined plane at one end of the projection 27b as shown in FIG. 4 pushes a bent rib 6c formed below the magazine lock lever 6 to rotate the magazine lock lever 6 in the direction of F an arrow, thereby causing the hook 6b formed at the leading edge of the magazine lock lever 6 to be unlocked from the dent 3b formed at the side wall of the magazine 3. As the differential rack 27 is furthermore driven in the direction of B, the magazine 3 is pushed out in the direction of B by that the pusher 33a of an eject lever 33 provided at the magazine base plate 7 is pushed by the pusher 27b of the differential rack 27. Then, the state enters that shown in FIG. 3C.

The eject lever 33 is so composed that the eject lever 33 can slide by a fixed distance in either direction of A or B by engagement of an axis 34 provided at the magazine base plate 7 with the slot 33b and that a bent portion 33c at one end thereof can push out the lower part of the magazine 3.

At this time, the switch 29 and another switch 30 are composed in such a manner that the former switch 29 can be turned ON by a switch dog 27e of the differential rack 27 and the latter switch 30 can be turned ON by the switch dog 27b of the differential rack 27.

Figure 5:
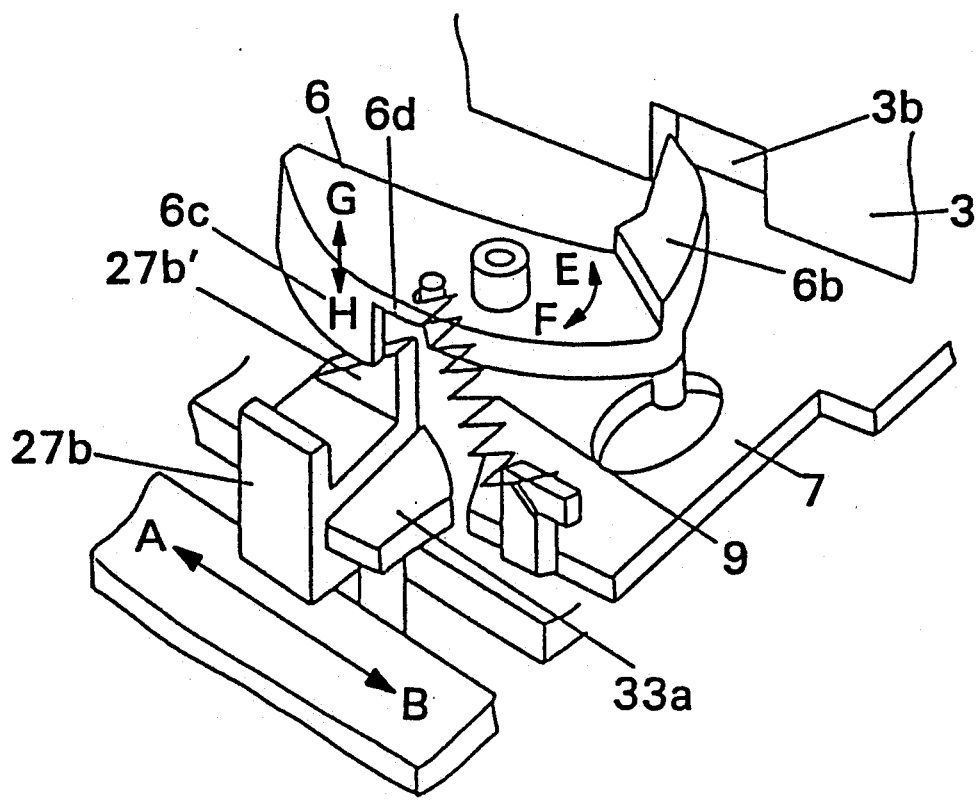

As shown in FIG. 3D and FIG. 5, in the case the magazine 3 is inserted in the magazine base 5, the magazine lock lever 6 is rotated in the direction of an arrow E by the drawing spring 9, and the hook 6b is engaged with the dent 3b provided at the side wall of the magazine 3 and locked so that the magazine 3 can not be pushed out in the direction of B.

The eject lever 33 is pushed in the direction of A and drives the switch dog 27b of the differential rack 27 in the direction of A.

At this time, the switch 30 is separated from the switch dog 27b of the differential rack 27 and is turned OFF. Also, the switch 29 is separated from the switch dog 27e of the differential rack 27 and is turned OFF. The motor 22 rotates to cause the drive gear 15 to rotate in the direction of an arrow in FIG. 3D. Then, only the differential rack 27 is driven in the direction of A and stops as shown in FIG. 3A.

When the differential rack 27 is driven by the motor 22 and moves in the direction of A, the differential rack 27 passes after pushing the rib 6c of the magazine lock lever 6 upwards in the direction of G by means of the inclined plane of the projection 27b' having an inclined plane as shown in FIG. 5.

The magazine lock lever 6 is made of a resin material having springing characteristics such as acetal resins. The magazine lock lever 6 is so composed that when the spring portion 6d thereof formed to be thin pushes up the above rib 6c in the direction of G the lever 6 can be bent and the above rib 6c can be restored again in the direction of H as the switch dog 27b' passes the rib 6c of the magazine lock lever 6.

The reference numeral 35 is an elevating and lowering motor having a belt 39 between the pulley 36 provided at the upper part thereof and a pulley gear 38 so composed as to rotate centering around an axis 37 installed at the mechanism body 4.

An intermediate gear 41 so provided as to rotate centering around an axis 40 is so composed that the intermediate gear 41 can be engaged with a gear 43a of the elevating and lowering worm gear 43 so installed as to rotate centering around the axis 42 and the above pulley gear 38.

Figure 6:
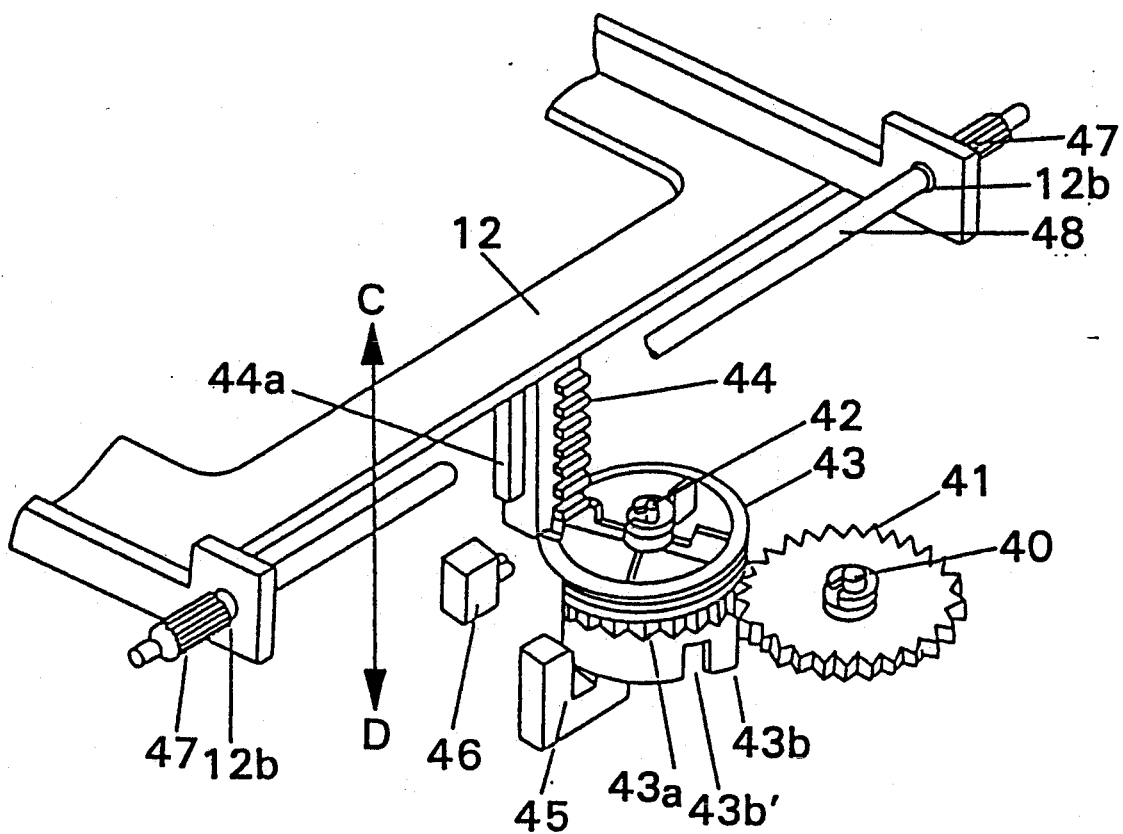
FIG. 6 is a perspective view showing the vertical drive structure of a loading base.

In FIG. 6, the reference numeral 44 is an elevating and lowering rack, which is provided at the lower part of the loading base 12 and is so constructed that it can elevate and lower the loading base 12 in either direction of C or D in engagement with the above elevating and lowering cam 43.

The reference numeral 43b is the wall of a sensor formed to be ring-like at the lower part of the elevating and lowering worm gear 43, and a slit 43b' is formed therein.

The reference numeral 45 is a photo cell switch so composed that it can count the number of revolutions of the above elevating and lowering cam by passing of the slit 43b' thereby.

The interval between the teeth of the elevating and lowering rack 44 is formed to be equal to the interval between the shelves 3a of the magazine 3. The teeth of the elevating and lowering rack 44 are so composed as to be sent by one tooth per revolution of the elevating and lowering worm gear 43.

The reference numeral 46 is a limit switch so composed that it can be turned ON by a projection 44a formed on the elevating and lowering rack 44 when the elevating and lowering rack 44 falls in the direction of D and the tray hook 10 falls below the position of the lowest shelf of the magazine 3.

The reference numeral 47 is a timing gear to prevent the loading base 12 from any inclination and is fixed at both the ends of a gear shaft 48 passed through the hole 12b installed at both the sides of the loading base 12.

The reference numeral 5b is a toothed portion installed at both the ends of the magazine base 5 and is so composed as to be engaged with the timing gear 47. A guide 48a so formed as to be projected from the timing gear 47 toward both the ends of the gear shaft 48 is so composed that the guide 48a is fitted in the guide groove 5c formed at both the ends of the magazine base 5 and the timing gear 47 can not be disconnected from the toothed portion 5b of the magazine base.

The reference numerals 49 and 50 are an elevating and lowering lever and a sub elevating and lowering lever, respectively, by which the loading base 12 can be elevated and lowered as being kept horizontally. A pair thereof are installed at both the sides of the loading base 12.

Such a construction is made that an axis 51 provided at the loading base 12 can be fitted and pivoted in a hole 49a provided at one end of the elevating and lowering lever 49, at the same time; another axis 52 provided at the central part of the elevating and lowering lever 49 can be fitted in a slot 50a provided at the central part of the sub elevating and lowering lever 50; still another axis 53 secured at the other end of the elevating and lowering lever 49 can be inserted in slots 54a and 54a' of the mounting parts 54 and 54' provided at the mechanism body 4, axes 55a and 55a' of supporting means 55 and 55' provided at the mechanism body 4 can be also inserted and pivoted in a hole 50b provided at one end of the sub elevating and lowering lever 50, and an axis 56 provided at the loading base 12 can be inserted in a slot 50c provided at the other end of the sub elevating and lowering lever 50. Thus, the loading base 12 can be horizontally retained by driving the axis 56 installed at the loading base 12 in the direction of C by means of the slot 50c of the sub elevating and lowering lever 50 by the distance for which the axis 51 is driven in the direction of C after the axis 52 of the elevating and lowering lever 49 lifts up the upper part of the slot 50a of the sub elevating and lowering lever 50 when the axis 51 is driven in the direction of C.

Figure 7:
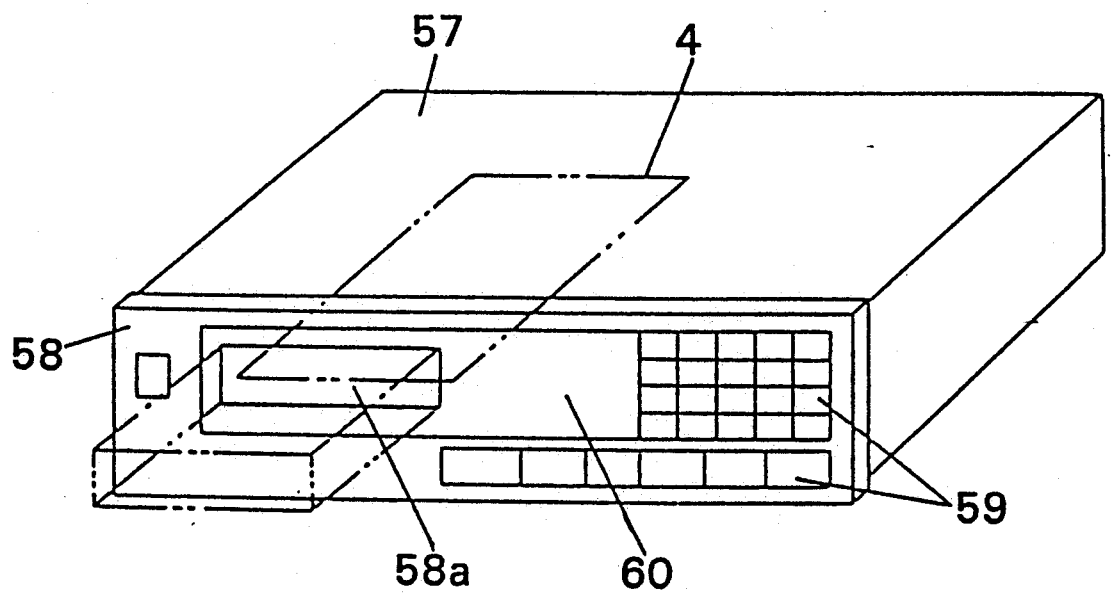
FIG. 7 is a perspective view showing the whole multi-disk player of this invention.
Figure 8:
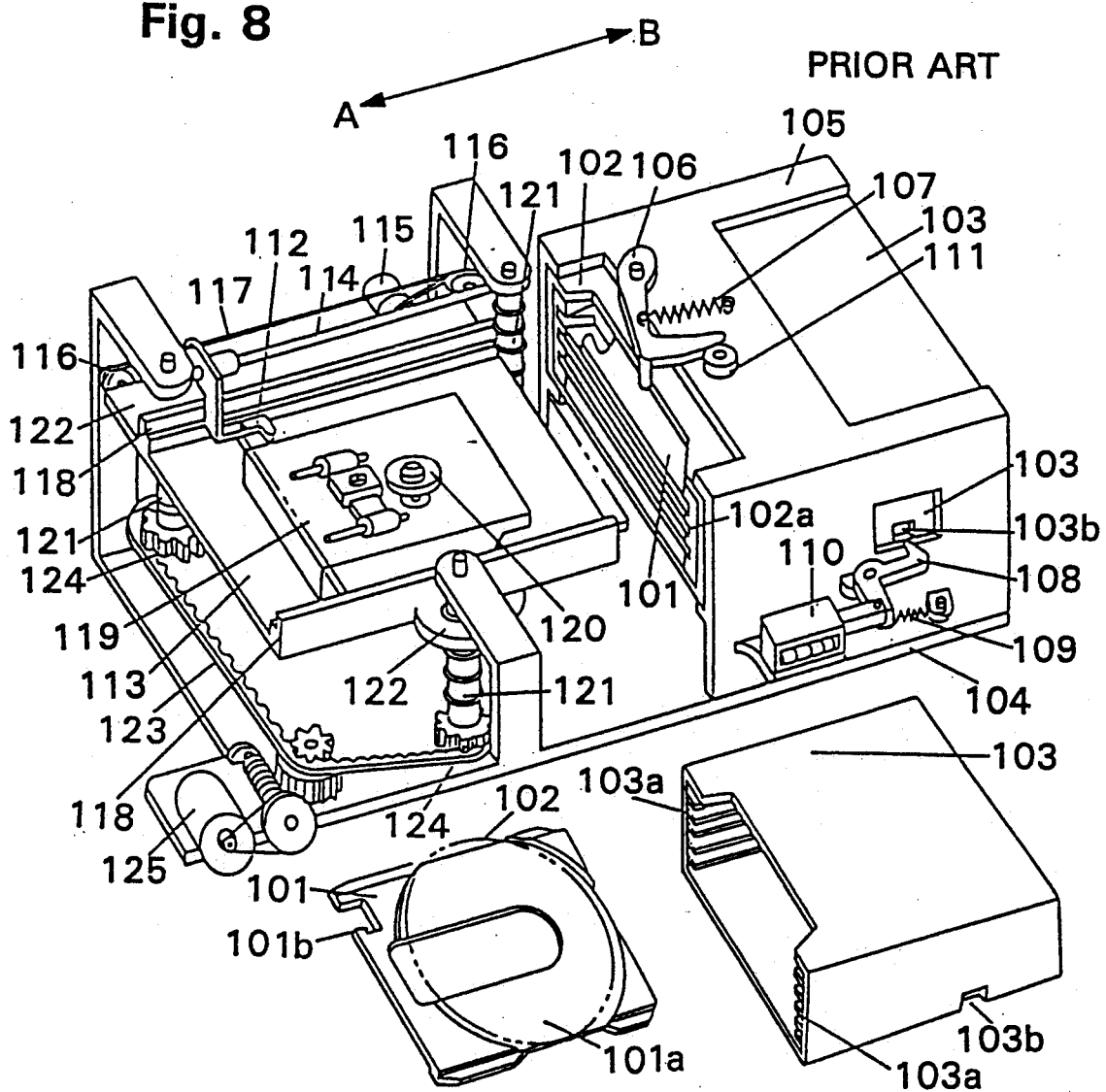
FIG. 8 is a perspective view showing a conventional multi-disk player.
Figure 1:
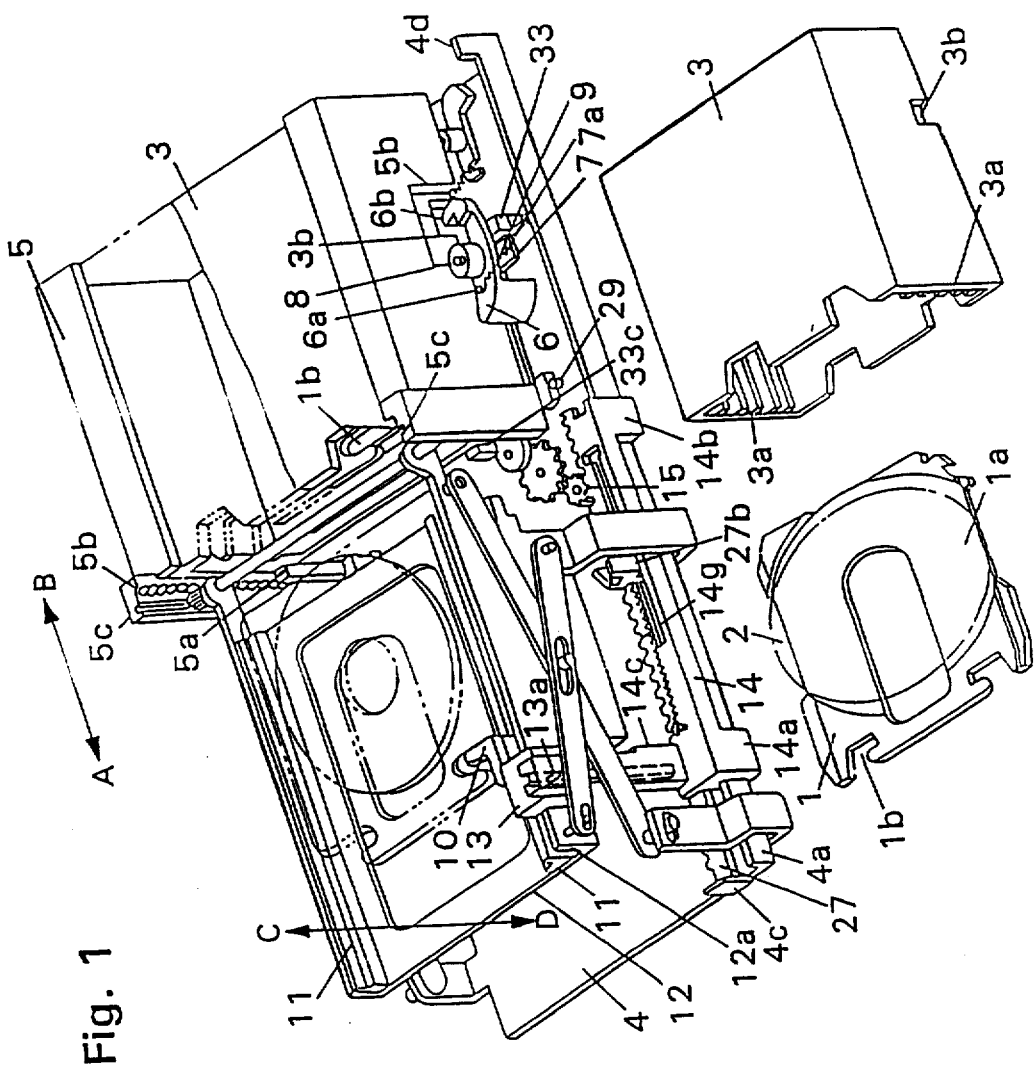
Figure 6:
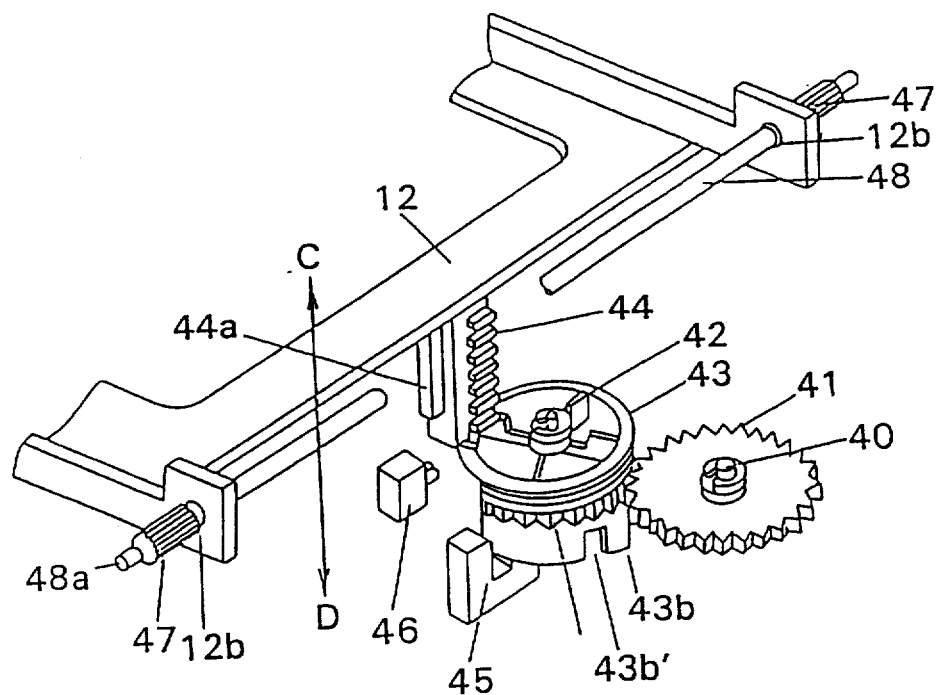
Figure 2:
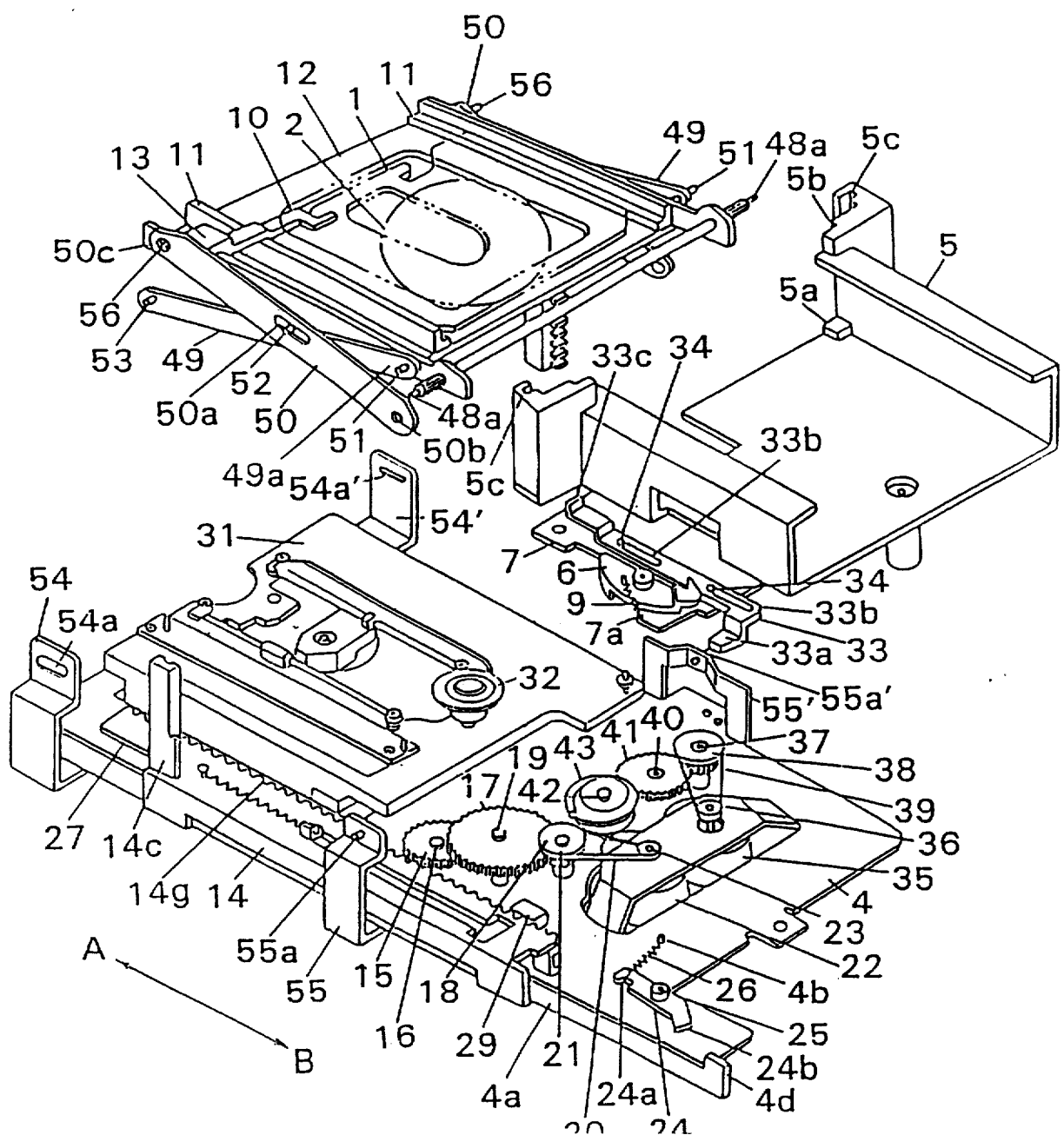

FIG. 7 shows the whole multi-disk player of this invention, and the front panel 58 of the player housing 57 is provided with an opening 58a for mounting the magazine 3 to store disks in the player housing 57.

Still further, the above front panel 58 is furnished with a group of operation buttons 59 for operating the multi-disk player and the display section 60.

The reference numeral 4 is the mechanism body of the multi-disk player of this invention and is disposed in the player housing 57.

The movements of the multi-disk player so composed as described above are explained with reference to FIGS. 1 through 7.

First of all, as a disk to be played is designated by operating a group of operation buttons 59 shown in FIG. 7, drive voltage is supplied to the elevating and lowering motor 35 and the loading base 12 is elevated in the direction of C by the drive of the elevating and lowering cam worm gear 43 and the elevating and lowering rack 44. Then, the loading base 12 stops at the position of the designated disk. This position is detected by combination of a known micro computer according to the number of counting of the photo cell switch 45.

Subsequently, drive voltage is supplied to the motor 22. Then, the drive rack 14 and the differential rack 27 are driven in the direction of A by engagement with the drive gear 15 and stop with the switch 30 turned ON under the conditions shown in FIG. 3B.

At this time, the tray hook block 13 is driven in the direction of A by engagement with the projection 13a and the column members of the drive rack 14 altogether. And the tray hook 10 draws out the tray 1 until the center of the turntable 32 of the light pick-up block 31 is almost aligned with the center of a disk 2 on the tray 1.

Next, reversing voltage is given to the elevating and lowering motor 35 to cause the loading base 12 to shift down in the direction of D. And the loading base 12 actuates the limit switch 46 and stops after it further shifts down by a fixed distance. This descending position is detected by combination of a known micro computer according to the number of counting of the photo cell switch 45.

At this time, the disk 2 is sent onto the turntable 32 of the light pick-up block 31, and playing is started with a specified clearance secured between the disk 2 and the tray 1.

After the playing ends, drive voltage is supplied to the elevating and lowering motor 35 by combination of the final end detection means and a micro computer, both of which are known, and the loading base 12 is elevated in the direction of C and stops at the position, where the disk 2 was taken out from at the beginning, memorized by a micro computer.

Next, as reversing voltage is given to the motor 22, the drive rack 14 and the differential rack 27 are driven in the direction of B and stop at the position shown in FIG. 3A. Then, the switch 29 is turned ON. At this time, the tray 1 and the disk 2 are housed in the magazine 3.

Subsequently, as reversing voltage is given to the elevating and lowering motor 35, the loading base 12 shifts down in the direction of D, thereby causing the limit switch 46 to be turned ON. Then, the loading base 12 stops. By operating a group of operation buttons 59, six disks in the magazine can be consecutively played, program playing of only a favorite disk is available, and repeated playing of one disk is also possible by combination of a known micro computer.

In the case the eject button of a group of operation buttons 59 shown in FIG. 7 is pushed when taking out the magazine 3 from the player housing 57, only the operation rack 27 is driven in the direction of B as shown in FIG. 3C,' and continuously the magazine lock lever 6 is unlocked from the magazine 3. After that, it is possible to take out the magazine 3 by pushing out the magazine 3 in the direction of B as the eject lever 33 is pushed in the direction of B. At this time, both the switches 29 and 30 are turned ON.

As the magazine 3 pushes the eject lever 33 in the direction of A and the eject lever 33 pushes the differential rack 27 in the direction of A as shown in FIG. 3D when inserting the magazine 3 in the player housing 57, the switch 30 is separated from the switch dog 27b of the differential rack 27 and is turned OFF. As shown in FIG. 3A, the differential rack 27 is driven in the direction of A until the switch 29 is turned ON by the switch dog 27c of the differential rack 27.

As described above, this invention features that one elevating and lowering rack provided at one end of the loading base is vertically driven by one elevating and lowering worm gear provided at the side of mechanism body to cause the horizontal retaining mechanism of the loading base, consisting of the elevating and lowering lever and the sub elevating and lowering lever, which are installed at the side of the loading base, to be driven and that the whole loading base can be vertically driven as keeping the horizontality of the loading base. Therefore, the invention can provide a multi-disk player in which the loading base can be vertically driven at a high speed by lightening the driving load of elevating and lowering.

UTILIZATION OF THE INVENTION

The present invention can provide a multi-disk player in which the whole loading base to select any disk(s) of a plurality of disks and to supply the same by turns to the disk playing section is lightened to cause the elevating and lowering speed to be quickened and the elevating and lowering mechanism to be simplified, thereby causing a disk to be speedily supplied to the disk playing section.

We claim:
1. A multi-disk player comprising:
   a magazine in which a plurality of disks are vertically stacked and axially aligned with one another and housed;
   a loading base which can be elevated and lowered in the vertical direction opposite to said magazine and can choose any of the stored disks;
   an elevating and lowering drive portion of said loading base to transmit an elevating and lowering drive force to part of said lowering base, the elevating and lowering drive portion including an elevating and lowering rack installed at a part of the loading base;
   an elevating and lowering worm gear provided at a mechanism body of the multi-disk player to drive said elevating and lowering rack;
   a drive source of said elevating and lowering worm gear provided at the mechanism body, said loading base being vertically elevated or lowered incrementally by one shelf of said magazine for each rotation of said elevating and lowering worm gear;
   an elevating and lowering lever, one end of which is pivoted at the loading base and the other end of which is slideably pivoted at the mechanism body of the multi-disk player;
   a sub elevating and lowering lever, one end of which is pivoted at said mechanism body and the other end of which is slideably pivoted at said loading base;
   a pin being provided proximate the center of one of said elevating and lowering lever or said sub elevating and lowering lever; and
   a slot being provided proximate the center of the other one thereof, said elevating and lowering lever being engaged with said sub elevating and lowering lever by means of said pin and said slot and being intercrossed and arranged generally like an X shape, said loading base being horizontally retained by both the levers, and at the same time said loading base being elevated and lowered by said elevating and lowering drive portion.

* * * * *

UNITED STATES PATENT AND TRADEMARK OFFICE
CERTIFICATE OF CORRECTION

PATENT NO. : 5,247,500
DATED : September 21, 1993
INVENTOR(S) : Seizo Miyoshi, et al.

It is certified that error appears in the above-identified patent and that said Letters Patent is hereby corrected as shown below:

The sheets of drawings, consisting of figures 1, 3a 3b and 6, should be deleted to appear as per attached sheets.

Signed and Sealed this

Eighteenth Day of April, 1995

Attest:

BRUCE LEHMAN

*Commissioner of Patents and Trademarks*

*Attesting Officer*

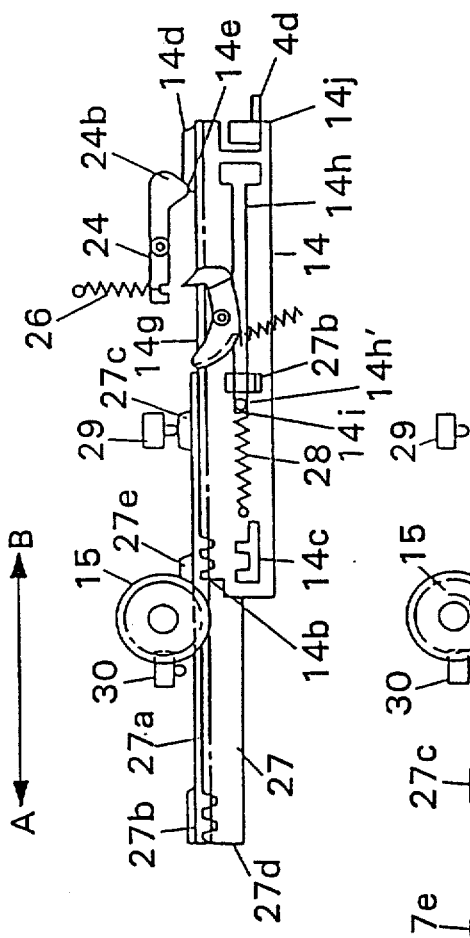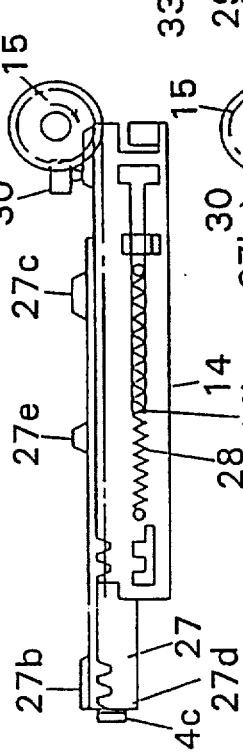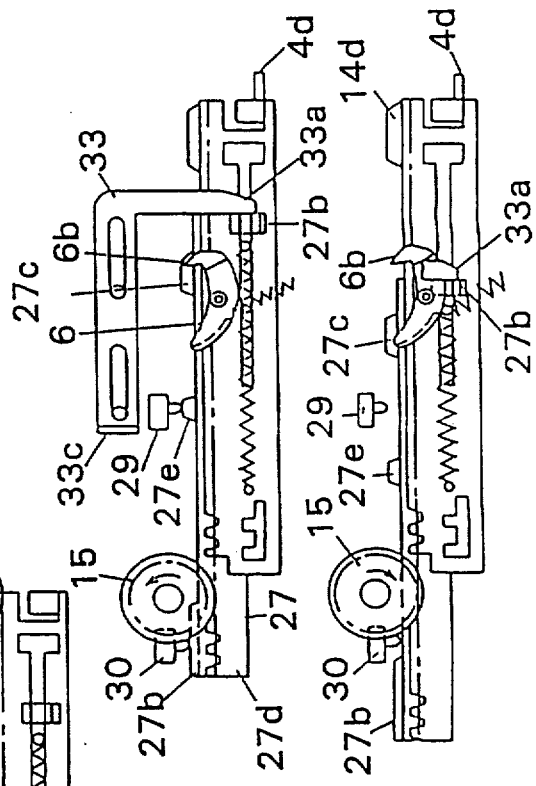

UNITED STATES PATENT AND TRADEMARK OFFICE
CERTIFICATE OF CORRECTION

PATENT NO. : 5,247,500              Page 1 of 2
DATED      : September 21, 1993
INVENTOR(S): Seizo Miyoshi et al.

It is certified that error appears in the above-indentified patent and that said Letters Patent is hereby corrected as shown below:

In the Drawings:

Replace the drawing of Fig. 2 with the attached drawing of Fig. 2.

Signed and Sealed this

Ninth Day of January, 1996

Attest:

BRUCE LEHMAN

Attesting Officer    Commissioner of Patents and Trademarks